United States Patent Office.

JAMES JENKINS, OF ELIZABETH, AND GEO. H. COOK, OF NEW BRUNSWICK, NEW JERSEY.

IMPROVED METHOD OF WORKING SILICIOUS AND OTHER CALAMINE ORES OF ZINC.

Specification forming part of Letters Patent No. 34,146, dated January 14, 1862.

*To all whom it may concern:*

Be it known that we, JAMES JENKINS, of the city of Elizabeth, in the county of Union and State of New Jersey, and GEORGE H. COOK, of the city of New Brunswick, in the county of Middlesex and State of New Jersey, have discovered a new and useful Method for the Working of Silicious and other Calamine Ores of Zinc; and we do hereby declare that the following is a full and exact description thereof.

Our method of operation consists in adding to the ores a flux consisting of the common oxide of iron or iron ore, or of lime or limestone, or other basic substance in quantities sufficient to form, with the silica and other earthy impurities of the ore, a cinder or slag, using either of these separately with the ores, or two or more in mixture with them, so as to produce the specified result. The ores, in mixture with any or all of these substances, may be prepared and worked in any of the present well-known and usual ways and in any of the furnaces at present in use, or may be worked in the cupola-furnace, where the mass will finally become fused, and the slag, when formed, may be drawn off at intervals in a liquid state. Where these ores are, as now, worked so as to leave from ten to twenty per cent. of zinc the residuum so left may, by the addition of this flux, be worked over in any of the furnaces, as above.

The proportions of oxide of iron or iron ore, lime or limestone, or other basic substance necessary to the proper working of the ores of the various qualities are dependent on the quality of the ores, and are to be determined by the working. In the residuum of these ores, after they have been treated by any of the processes at present in use, from ten to twenty per cent. of the metal remains, which fact is incident to the method of working the ores, while the residuum from such working is now and has hitherto been deemed valueless. The object which our discovery accomplishes leaves the quantity of zinc in the residuum ranging from nothing to six per cent.

We are aware that the materials we use have been suggested before; but the methods of using them were such as not to be successful in practice. An absolute and quick fusion of the ore and flux will not liberate the zinc. The temperature must be kept moderate and the process allowed to go on steadily for a considerable time, the latter resembling in its principal stages a roasting rather than a perfect fusion.

What we claim as our discovery, and desire to secure by Letters Patent, is—

The use of oxide of iron, iron ore, lime or limestone, or other basic substance, either separately or mixed, as a flux or fluxes for separating the silica and other earthy impurities from the zinc contained in the silicious and other calamine ores of this metal, in the manner substantially as set forth, these ores being first prepared for working in the common way.

JAMES JENKINS.
GEO. H. COOK.

Witnesses:
JNO. C. ELMENDORF,
MARTIN NEVINS.